United States Patent [19]
Hinkel et al.

[11] Patent Number: 5,799,762
[45] Date of Patent: Sep. 1, 1998

[54] HYDROKINETIC TORQUE CONVERTER WITH BRIDGE COUPLING

[75] Inventors: Rüdiger Hinkel, Röthlein; Uwe Dehrmann, Würzburg, both of Germany

[73] Assignee: Fichtel & Sachs AG, Schweinfurt, Germany

[21] Appl. No.: 708,404

[22] Filed: Sep. 4, 1996

[30] Foreign Application Priority Data

Oct. 4, 1995 [DE] Germany ............... 195 36 952.1

[51] Int. Cl.$^6$ .................................................. F16H 45/02
[52] U.S. Cl. .................................. 192/3.29; 192/52.2
[58] Field of Search ......................... 192/3.28, 3.29, 192/3.3, 3.26, 48.7, 52.2

[56] References Cited

U.S. PATENT DOCUMENTS

| | | | |
|---|---|---|---|
| 3,463,033 | 8/1969 | Fisher | 192/3.3 X |
| 4,690,257 | 9/1987 | Suzuki et al. | 192/3.31 |

FOREIGN PATENT DOCUMENTS

| | | |
|---|---|---|
| 3823210 A1 | 1/1990 | Germany. |
| 1551124 | 8/1979 | United Kingdom. |

Primary Examiner—Richard M. Lorence
Attorney, Agent, or Firm—Cohen, Pontani, Lieberman, Pavane

[57] ABSTRACT

A hydrokinetic torque converter with a housing (23, 26) connected to an internal combustion engine; a turbine (21); and a bridge coupling or lock-up clutch (45) which has a plurality of friction linings (1, 7; 31, 39, 40; 54, 57) that can be brought in a predeterminable order and independent of one another into active connection with a particular associated friction surface for establishing a frictional connection between the housing (26) and the turbine wheel (21). Under pressure the converter bridge coupling acts initially as a single-surface and later as a double-surface converter coupling. In addition, the bridge coupling can have a low transmission capacity per pressure unit in the low pressure range and the transmission capacity can be increased disproportionately starting at a certain pressure range.

13 Claims, 4 Drawing Sheets

HYDROKINETIC TORQUE CONVERTER WITH BRIDGE COUPLING

BACKGROUND OF THE INVENTION

1. Field of the Invention

The present invention relates to a hydrokinetic torque converter with a housing that is connected to an internal combustion engine; a turbine and a bridge coupling or lock-up clutch that has friction surfaces for establishing a frictional connection between the housing and the turbine.

2. Background of the Invention

Hydrokinetic torque converters can be combined with planetary gear sets to form automatic transmissions. In the higher gears, the bridge coupling or lock-up clutch serves to connect the housing wall on the motor-side to the turbine, so that the hydrokinetic torus of the converter can be bypassed. Due to this mechanical coupling, energy losses in the torque converter do not occur at higher speeds and the efficiency of the transmission increases.

The transmission capacity of the bridge coupling in DE 38 23 210 depends to a great extent on the closing pressure. For this, an axially movable lamella disk equipped on both sides (viewed in the axial direction) with friction surfaces is connected to the turbine shell or shroud in a turn-proof or non-rotatable fashion. A piston arranged in an axially-movable fashion in the converter housing is equipped with a ring-shaped friction surface in the area of the associated friction surface of the lamella disc. When the fluid pressure increases in the converter space, the piston moves in the direction of the housing half disposed on the motor-side, on which a further ring-shaped friction surface is provided opposite the friction surface mounted on the lamella disc. The piston is now connected to the converter housing in a turn-proof or rigid fashion. When the pressure increases in the converter space, the piston is moved in the direction of the housing half facing the motor-side, thereby establishing a frictional connection between the friction surfaces of the lamella disk and the respective associated friction surfaces of the piston and the converter housing. When completely engaged the turbine turns at the speed of the housing, whereby the same pressure force acts on both friction surfaces.

The transmissibility of the torque of such a coupling is proportionately dependent on the pressure that acts upon the piston. In the case of controlled-slipping converter couplings, it is customary to use deliberate slip in order to create a relative movement between the housing and the lamella disk, on the one hand, and between the lamella disk and a piston of the bridge coupling, on the other; this is done, for example, for the purpose of vibration damping. Thus, when the closing pressure is low, only a slight torque can be transmitted by the bridge coupling. If a rigid connection is to be established between the turbine and the housing, the closing pressure must be increased significantly, which results in higher stress on the components.

SUMMARY OF THE INVENTION

Accordingly, a torque converter is provided wherein an increase in the closing pressure of a bridge coupling or lock-up clutch results in a disproportionate increase in transmission capacity.

To this end the bridge coupling is equipped with a plurality of friction linings, which can be brought, independent of one another and in a predeterminable order, into active connection with the particular associated friction surface. It is thus possible through pressurization to initially move only one friction lining onto the associated friction surface of the converter housing. When the pressure increases, at least one further friction lining is activated, i.e., it is moved for engagement onto the friction surface of either the housing or of the piston of the bridge coupling. This increases the active friction surface accordingly, so that when pressure increases continuously, a torque-transmission-jump occurs.

The friction linings are preferably parts of different friction couplings or clutches. This ensures that the bridge coupling initially works with at least one friction lining and then works with at least two friction linings, so that in a low pressure range, the transmission capacity per pressure unit is slight, while starting at a certain relatively higher pressure or pressure range, the transmission capacity per pressure unit is disproportionately higher. This allows the stress on the individual friction linings to be reduced.

Furthermore, the friction linings of the friction couplings are preferably constructed in such a way that at least two friction linings differ from one another in respect to their mean friction radius.

It is especially advantageous to provide for only two different friction linings. These friction linings can be designed in the shape of rings or ring-segments; it is also especially preferable that each friction lining has a different friction coefficient. This permits a further variation of the action of the transmission coupling, i.e., its characteristic curve. For example, if the friction coefficient of the first friction lining to engage the housing is higher than that of the second, then the transition is softer; if the friction coefficient of the first friction lining is lower than that of the second, then the transition is harder. In principle, this measure even permits for the transmittable toque curve to be designed degressively, in that the friction coefficient of the first friction lining is substantially higher than that of the second, when in exceptional cases no disproportionate increase in torque transmissibility is desired.

In a further preferred embodiment, the friction linings have different outer and inner diameters. As a result, the axial space needed in the converter housing can be kept small, because the friction linings are able to act on the same axial level.

In order to reduce the number of required components, it is advantageous for all friction linings to be arranged on a common lining-carrier disk.

The friction surfaces of individual friction linings preferably deviate, in respect to diameter and geometry, from the friction surfaces of the other friction linings.

In an advantageous embodiment, a first friction lining acts on the inner side of the housing half located on the motor-side, while a second friction lining acts on a piston that is connected to that housing half in a turn-proof or rigid fashion. This embodiment allows the friction lining of the first friction coupling (single-surface converter coupling) to simultaneously perform the task of the second friction lining of the second friction coupling (double-surface converter coupling).

If the piston moves axially against the force of at least one spring, it is possible to adjust the minimum pressure needed to move the piston. In an especially preferred embodiment, each friction lining is arranged on its own associated lining-carrier disk. When the friction linings are arranged on an axially movable piston, and one friction lining is connected directly to the piston, while the other is connected to the piston on a lining-carrier disk via at least one spring element, the pressure force for the first friction lining corresponds to the spring force. It is then possible to increase the pressure force alone by increasing the pressure in the converter space when the friction lining directly connected to the piston is also put directly onto the friction surface; the further increase in force is then introduced via the piston movement.

Advantageously, the lining-carrier disk is bent inward at a right angle and is provided with at least one bore hole in the cylindrical mantle surface thus formed. This bore hole is at least partially closable by a seal mounted on the piston. In this embodiment, the bore hole is open as long as the second friction lining does not rest on the housing so that the converter fluid can flow from the converter space into the piston space and there extract the heat created when the converter coupling is run in a controlled fashion in the first stage, so that a relative movement occurs between the first friction lining and the converter housing.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

The present invention is described in greater detail below with reference to the drawings in which.

DETAILED DESCRIPTION OF THE PRESENTLY PREFERRED EMBODIMENTS

In the description components with the same function are identified by the same reference numbers.

Figure 1:
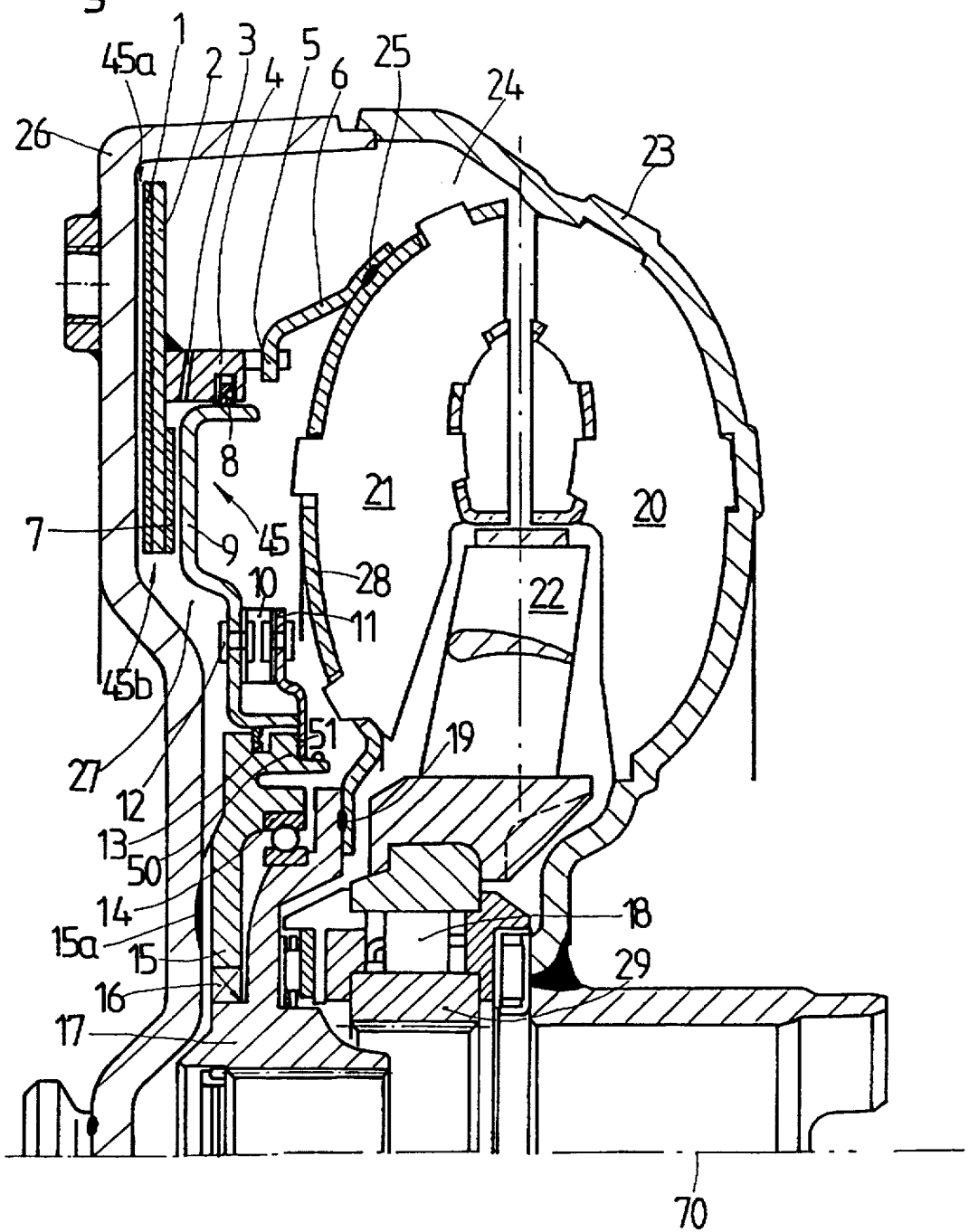
FIG. 1 is a cross-sectional view of the upper half of an embodiment of the hydrokinetic torque converter of the present invention.

FIG. 1 shows the upper half of the hydrokinetic torque converter of the present invention, which is arranged concentrically relative to a rotational axis 70. The torque converter comprises the impeller 20, the turbine 21 and the stator 22, which is connected to the stator hub 29 via the freewheel mechanism or roller elements 18. The turbine wheel 21 is part of a turbine shell or shroud 28, which is rigidly connected to the turbine hub 17 by a welded seam 19. A take-along element 6 with radially inward toothing is attached to the turbine shell 28 by a welded seam at 25 in the radially upper area of the shroud. The housing of the impeller 20 is formed by the housing half 23.

A bridge coupling or lock-up clutch 45 is provided between the turbine 21 and the housing half 26 of the converter facing the motor. In the embodiment shown in FIG. 1, the bridge coupling or lock-up clutch 45 comprises the carrier disk 2 for the friction linings with the welded-on hollow-cylindrical take-along element 4, and the piston 9, which is connected to the disk-shaped take-along element 11 via the springs 10. On the ring surface that faces the housing half 26, the lining-carrier disk 2 is covered completely with a first friction lining 1. Within the hollow-cylindrical take-along element 4, on the side of the disk 2 facing away from the housing half 26, a second ring-shaped friction lining 7 is located. Measured from the axis 70 the inner diameters of the friction surfaces 1 and 7 are identical, while the outer diameters differ in size. The take-along element 4 has a bore hole 3 extending in a substantially radial fashion and through which the converter space 24 is connected to the piston space 27. In a radially inner circumferential groove, a seal 8, which rests on the disk-shaped piston 9, is placed into the hollow-cylindrical take-along element 4. For this purpose, the piston 9 is axially angled in its radially outer area, so that a cylinder mantle surface is created. By means of a sealing element 13, the piston 9 is sealed radially inwardly relative to the hub 15, which is connected to the housing half 26 by a welded seam 15a. The turbine hub 17 is supported on the hub 15 via a roller bearing 14 and is sealed relative thereto by the seal 16.

The sealing element 13 is disposed in an outer circumferential groove of the hub 15. In the axially inner area, a shoulder 50 located radially outward on the hub 15 serves as a stop for the take-along element 11 connected to the hub 15 in a rigid or turn-proof fashion. The piston 9 is also connected to the take-along element 11 in a turn-proof fashion by the rivets 12.

An axially inward toothing 5 on the take-along element 4 forms the connection between the bridge coupling or lock-up clutch 45 and the take-along element or arm 6, which in turn is connected to the turbine shell 28 at weld seam 25 as described. The toothing 5 permits an axial movement of the take-along element 4. The piston 9 is axially moveable relative to the take-along element 11 against the force of the springs 10.

In the disengaged or non-activated state of the bridge coupling 45, the lining carrier 2 rotates at turbine speed while the piston 9 rotates at housing speed. When the pressure in the converter space 24 is increased by the activation of a pump (not shown) and by the reduction of pressure in the piston space 27 in known manner the take-along element 4 moves in the direction of the housing half 26 (to the left in the drawing). The ring-shaped first friction lining 1 moves against the correspondingly-designed friction surface on the housing half 26. The converter space 24 is then separated from the piston space 27 by means of the piston 9, the sealing elements 8, 13 and 16, and the friction lining 1. The only existing connection between the converter space 24 and the piston space 27 is through the bore hole 3 disposed in the take-along element 4. The pressure in the converter space 24 acts not only on the lining-carrier disk 2, but also on the piston 9. However, at suitably low pressure, the springs 10 prevent the piston 9 from moving axially relative to the take-along element 11, which is securely attached to the hub 15. In this state, only one bridge coupling, i.e., the single-surface converter coupling or clutch 45a, is initially active. The active piston surface is defined by the outer diameter of the friction lining carrier 2 and the seal diameter of the sealing element 8. The torque is transmitted from the housing half 26 to the gear or output shaft (schematically shown at axis 70) via the first friction lining 1, the lining-carrier disk 2, the take-along element 4, the arm 6, the turbine shell 28 and the turbine hub 17.

When the pressure of the pressure medium in the converter space 24 is increased, the piston 9 moves axially in the direction of the hub 15 against the force of the springs 10 and comes to rest on the second friction lining 7, which is located on the inner side of the lining-carrier disk 2. The already active single-surface converter coupling 45a now has connected to it also a double-surface converter coupling 45b. The active piston surface of this double-surface converter coupling 45b is determined by the diameter of the sealing elements 8 and 13. The active piston area of the single-surface converter coupling 45a is maintained Depending on the selection of the friction linings 1, 7, the curve of the transmittable torque M varies in dependence on the pressure p, as shown in one of the curves in FIG. 4. Area I relates to the torque curve based on the first friction lining and Area II reflects the torque curve when both friction linings are engaged.

If a controlled converter coupling is desired, i.e., a relative movement between the friction lining 1 and the housing half 26, the frictional heat created thereby can be extracted or removed by means of the fluid that flows through the bore hole 3 from the converter space 24 into the piston space 27. Otherwise, the placement of the piston 9 on the friction lining 7 serves to separate the converter space 24 and the piston space 27 from one another.

The friction linings 1, 7 may be designed not only in the shape of a ring, but also as a plurality of ring segments. The friction linings 1, 7 can be attached or riveted to or inlaid into the lining-carrier disk 2.

Figure 2:
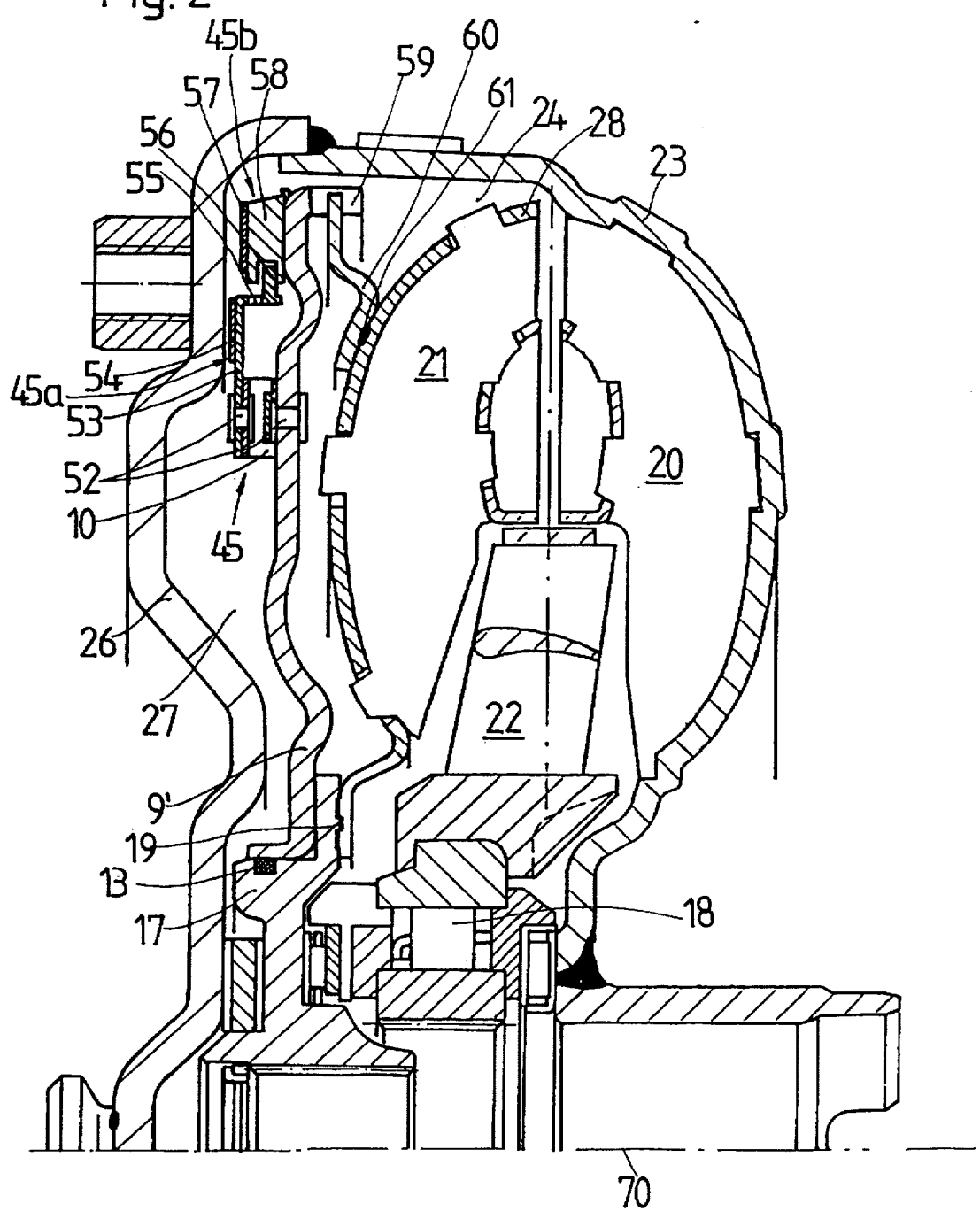
FIG. 2 is a longitudinal cross-sectional view of the upper half of another embodiment of the hydrokinetic torque converter of the present invention.

FIG. 2 shows a further embodiment of the present invention. The bridge coupling or lock-up clutch 45 comprises the piston 9', which is axially movable relative to the turbine hub 17. On the piston 9' there is a radially outer ring-shaped seal/friction-lining carrier 58. Lying radially further inward, there is a lining-carrier disk 53. The lining-carrier disk 53 is connected to the disk-shaped piston 9' by the rivets 52 or, as explained in reference to the embodiment described above, by leaf springs 10. In its radially outer area, the piston 9' is axially angled toward the inside, and there is a toothing 59, which engages with a take-along element 60 that has a corresponding counter-toothing and is connected rigidly to the turbine shell 28 by a welded seam 61. The turbine shell 28 is also connected to the turbine hub 17 by a welded seam 19. The piston 9' is sealed relative to the turbine hub 17 by the sealing element 13.

The lining-carrier disk 53 has a ring-shaped friction lining 54 on the side facing the housing half 26; radially outward, the lining-carrier disk 53 extends in the axial direction away from the housing half 26, so that a surface with the shape of a cylindrical mantle is formed. This surface is acted upon by a sealing element 56, which is seated in a radially inner circumferential groove on the seal/friction-lining carrier 58. In this way, the seal/friction-lining carrier 58 is sealed relative to the lining-carrier disk 53. In the cylindrical mantle area of the lining-carrier disk 53, there is at least one radial bore 55, permitting a medium to flow from the converter space 24 into the piston space 27, in order, as mentioned earlier, to extract frictional heat in cases in which a controlled converter bridge coupling or clutch is desired.

Figure 4:
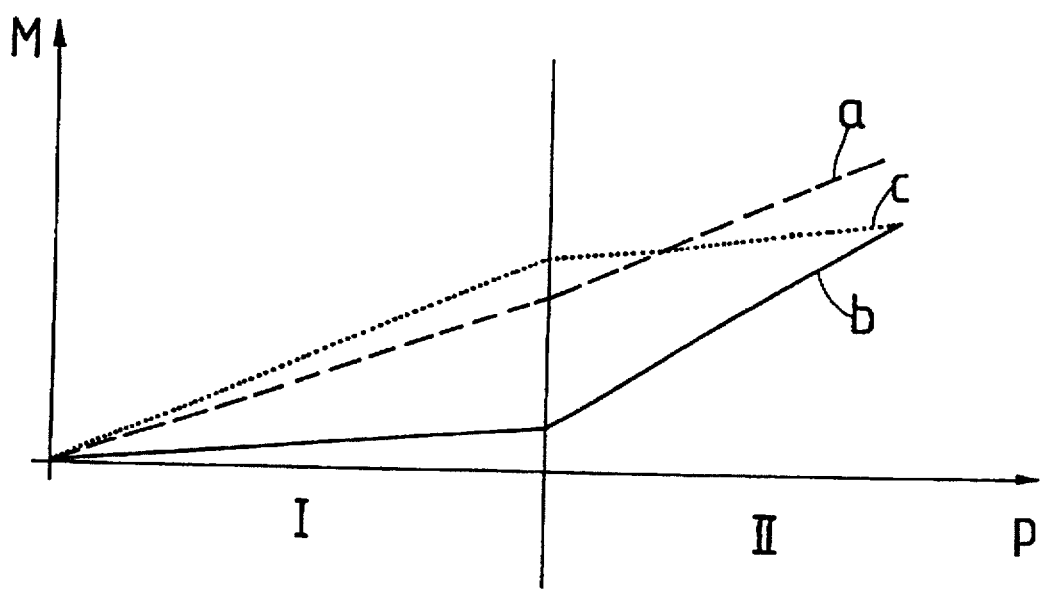
FIG. 4 shows the curve diagram of the transmission capacity of the bridge coupling of the present invention.

When the pressure in the converter space 24 is increased and the pressure in the piston space 27 decreased, the piston 9' moves in the direction of the housing half 26 until the first friction lining 54 comes to rest on the preferably correspondingly-designed friction surface in the housing half 26. The spring elements 10 serve to connect the lining-carrier disk 53 in a turn-proof fashion to the piston 9', so that the torque is now transmitted from the housing half 26 via the friction lining 54, the lining-carrier disk 53, the piston 9', the toothing 59, the take-along element 60, the turbine shell 28 and the turbine hub 17 rigidly connected thereto to the gear shaft schematically shown at 70. The active piston surface is determined by the surface of the piston 9' up to the friction lining 54. As long as the resulting pressure force is smaller than the force of the spring elements 10, further movement of the piston 9' is prevented, and thus the friction lining 57 is prevented from engaging the converter housing. When the pressure in the pressure space 24 is increased further, the piston 9' moves further toward the housing half 26. As this happens, the sealing element 56 first closes the radial bore 55, so that the piston space 27 is separated from the converter space 24. A further pressure increase then causes the friction lining 57 to be placed against the inner side of the housing half 26, so that the second converter coupling is activated and a torque curve analogous to the curves shown in FIG. 4 is established. The pressure required in the converter space 24 for this purpose is determined by the force of the springs 10. In this state, the piston surface up to the friction lining 57 acts as the active piston surface.

This arrangement makes it possible to work with a "small" bridge coupling when the pressure level in the converter space 24 is low and with a "large" bridge coupling when the pressure level in the converter space 24 is higher.

Figure 3:
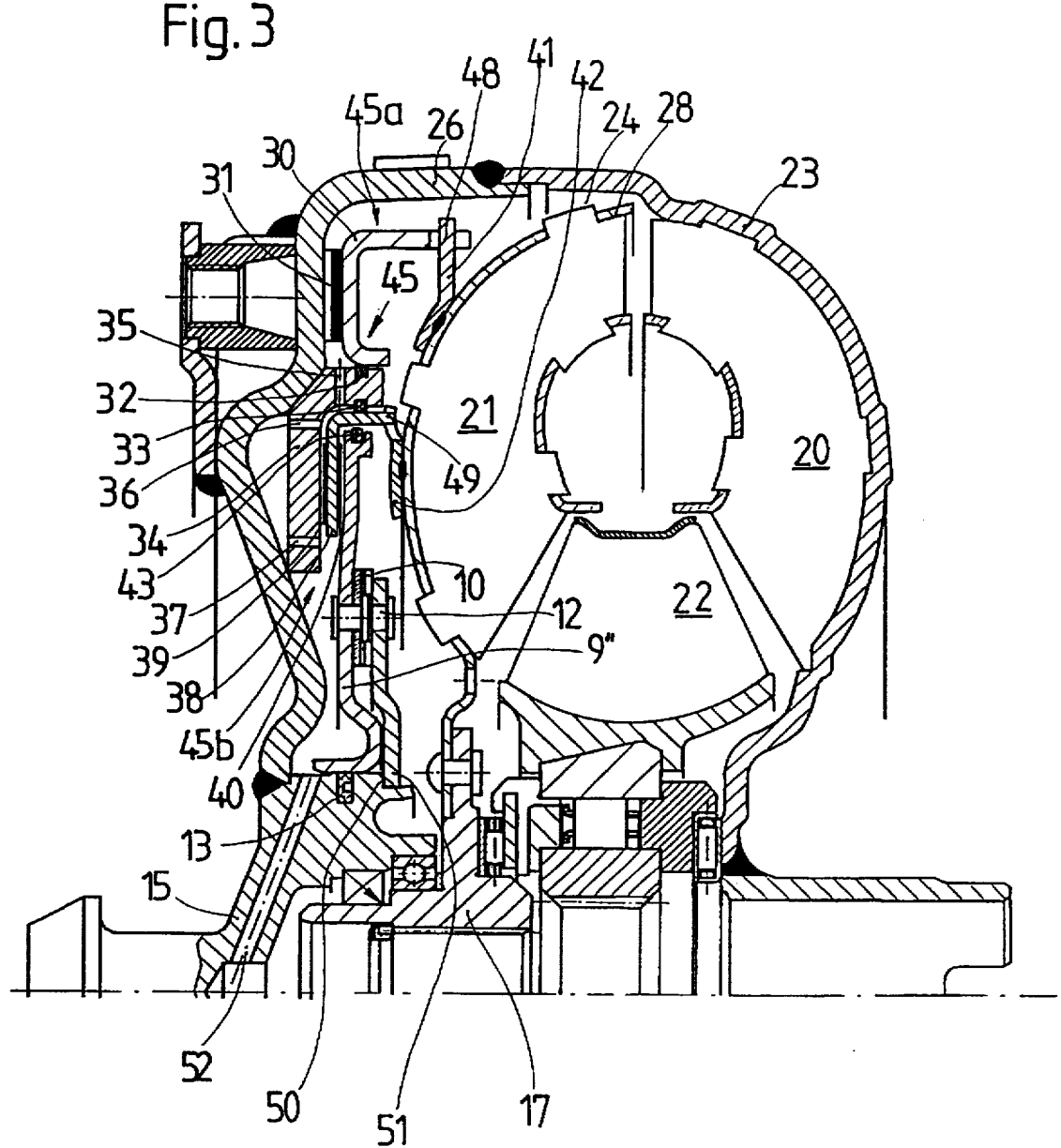
FIG. 3 is a longitudinal cross-sectional view of the upper half of a third embodiment of the hydrokinetic torque converter of the present invention.

A further embodiment of a single-surface and double-surface converter coupling is shown in FIG. 3. The disk-shaped piston 9" is mounted on the hub 15 so as to be movable in the axial direction. Rivets 12 or springs 10 serve to connect the piston 9" in a turn-proof fashion to the piston-carrying disk 51, which rests against a stop 50 on the hub 15 and is connected to the hub 15 in a turn-proof fashion. A sealing element 13 seals off the piston 9" from the hub 15. Welded to the housing 26 is a disk 34, which is L-shaped in half-cross-section and has two axial bores 36, 37 and a radial bore 35. On this disk 34, there is a friction surface for engagement with the double-surface converter coupling 45b. Between the piston 9" and the disk 34 there is a lamella shaped disk 38 bent into an L-shape, which serves as a lining-carrier disk and is connected by the toothing 49 to a take-along element 42 that is welded to the turbine shell 28. The disk 38 is provided on both sides with the friction linings 39, 40, and is sealed off from the disk 34 by means of a seal 33. Radially above the disk 34, there is a lining-carrier disk 30, which engages via a toothing 48 with a take-along element 41 attached to the turbine shell 28. The lining-carrier disk 30 is bent at a right angle twice in cross-section and is sealed radially inward against a sealing element 32 located radially outward in the disk 34. On the side facing the housing half 26, the lining-carrier disk 30 is provided with a ring-shaped friction lining 31.

When the pressure in the converter space 24 increases, the disk 30 moves to the left in the drawing, and the friction lining 31 comes to rest on the housing half 26. As long as the pressure remains sufficiently low, the springs 10 prevent any axial movement of the piston 9". A further pressure increase causes the piston 9" to act against the friction lining 40 on the lamella disk 38 and to press the disk 38 with the other lining 39 onto the disk 34, so that the double-surface converter coupling 45b is activated. The horizontal bores 37, 36 permit the flow of pressure fluid medium when the coupling 45 is to be released. When this happens, the fluid can simultaneously press the friction lining 31 back from the sealing surface via the radial bore 35.

FIG. 4 illustrates that different characteristic Curves a, b, c of the converter bridge coupling can be set by selecting the friction value of the friction linings. Thus, Curve a shows a bridge coupling in which the friction value of the friction lining that initially comes to rest on the housing lining is higher than that of the friction lining that subsequently comes to rest there, so that the transition occurs softly. Curve b shows the reverse case, in which the friction value of the friction lining that initially comes to rest is smaller than that of the friction lining that subsequently comes to rest, so that the transition is harder. An extreme example is shown by Curve c, in which the friction value of the friction lining that initially comes to rest is substantially higher than that of the second, so that even a degressive characteristic curve is possible.

The invention is not limited by the embodiments described above which are presented as examples only but can be modified in various ways within the scope of protection defined by the appended patent claims.

What is claimed is:

1. A hydrokinetic torque converter comprising:
   a housing (23, 26) for connection to an internal combustion engine and comprising a housing half (26) facing said engine;
   a turbine (21) rotatably disposed in said housing;
   a pressure medium activated bridge coupling (45) comprising a plurality of friction linings (1, 7, 31, 39, 40, 54, 57);
   means operable for independently and predetermineably establishing a releasable frictional connection between said housing and said turbine; and a piston (9) connected in turn-proof fashion to said housing half (26) and, a first one of said friction linings (1) being arranged for frictional interaction with said housing half (26) and said piston (9) being arranged for frictional interaction with a second one of said friction linings (7).

2. The torque converter of claim 1, wherein said bridge coupling (45) comprises a first friction coupling (45a) having a first friction lining (1, 31, 54) and a second friction coupling (45b) having at least one second friction lining (7, 39, 40, 57).

3. The torque converter of claim 1, wherein said friction linings (1, 7, 31, 39, 40, 54, 57) have a mean friction radius and wherein at least two of said friction linings have a different mean friction radius.

4. The torque converter of claim 1, wherein said friction linings (1, 7, 31, 39, 40, 54, 57) are ring-shaped.

5. The torque converter of claim 1, wherein said friction linings (1, 7, 31, 39, 40, 54, 57) are shaped as ring segments.

6. The torque converter of claim 1, additionally comprising a disk (2) for carrying at least one of said friction linings (1, 7).

7. The torque converter of claim 1, wherein said friction linings comprising surfaces having a diameter and geometry and wherein a first one of said friction linings differs with respect to its diameter and geometry from a second of one said friction linings.

8. The torque converter of claim 1, additionally comprising a spring (10) having a force, and wherein said piston (9) is arranged for axial movement against said spring force.

9. The torque converter of claim 3, additionally comprising a plurality of discs for carrying said friction linings, and wherein each friction lining is mounted on a separate one of said discs.

10. The torque converter of claim 1, wherein a first one of said friction linings has a first coefficient of friction and a second one of said friction linings has a second coefficient of friction and wherein said first coefficient of friction differs from said second coefficient of friction.

11. A hydrokinetic torque converter comprising:
    a housing (23, 26) for connection to an internal combustion engine and comprising a housing half (26) facing said engine;
    a turbine (21) rotatably disposed in said housing;
    a pressure medium activated bridge coupling (45) comprising a plurality of friction linings (1, 7, 31, 39, 40, 54, 57);
    means operable for independently and predetermineably establishing a releasable frictional connection between said housing and said turbine; and
    an axially movable piston (9') and a spring mounted on said piston, said spring having a force, a first one of said friction linings being rigidly mounted on said piston and a second one of said friction linings being mounted on said piston for movement against said spring force.

12. The torque converter of claim 11, additionally comprising a seal (56) disposed on said piston (9') and a disc (53) for carrying one of said friction linings, said disc (53) defining a cylindrical mantel surface facing away from said engine; said surface having at least one bore hole (55) arranged therein such that said bore hole is at least partially sealable by said seal.

13. A hydrokinetic torque converter comprising:
    a housing (23, 26) for connection to an internal combustion engine and comprising a housing half (26) facing said engine;
    a turbine (21) rotatably disposed in said housing;
    a pressure medium activated bridge coupling (45) comprising a plurality of friction linings (1, 7, 31, 39, 40, 54, 57); and
    means operable for independently and predetermineably establishing a releasable frictional connection between said housing and said turbine, a first one of said friction linings having a first coefficient of friction and a second one of said friction linings having a second coefficient of friction, said first coefficient of friction differing from said second coefficient friction.

* * * * *